United States Patent [19]

Takizawa et al.

[11] Patent Number: 5,116,193
[45] Date of Patent: May 26, 1992

[54] COUPLING FOR THREE-DIMENSIONAL FRAMED STRUCTURE

[75] Inventors: Takato Takizawa; Kouji Yamagishi, both of Toyama, Japan

[73] Assignee: Yoshida Kogyo, K.K., Tokyo, Japan

[21] Appl. No.: 648,988

[22] Filed: Jan. 31, 1991

[30] Foreign Application Priority Data

Jan. 31, 1990 [JP] Japan .................... 2-8900[U]
Jan. 31, 1990 [JP] Japan .................... 2-8901[U]

[51] Int. Cl.⁵ ........................................ B25G 3/00
[52] U.S. Cl. .................................. 403/27; 403/171; 403/176
[58] Field of Search .............. 403/171, 176, 167, 27, 403/362

[56] References Cited

U.S. PATENT DOCUMENTS

| 3,980,408 | 9/1976 | Jachmann | 403/362 X |
| 4,313,687 | 2/1982 | Apeztegui et al. | 403/171 |
| 4,692,054 | 9/1987 | Kirby | 403/176 X |
| 4,756,639 | 7/1988 | Hoshino | 403/362 X |
| 4,872,779 | 10/1989 | Iwai | 403/176 X |

FOREIGN PATENT DOCUMENTS 2233882 1/1975 France ........................ 403/171

Primary Examiner—Andrew V. Kundrat
Attorney, Agent, or Firm—Hill, Van Santen, Steadman & Simpson

[57] ABSTRACT

A three-dimensional framed structure is built up by interconnecting rod members end to end by knuckle members. Each rod member includes, at either end, a sleeve in which a connecting bolt is axially inserted from the inner side, and a rotary member disposed at an outer end of the sleeve in such a manner that each said rotary member is not turnable relative to the connecting bolt and is movable axially relative thereto. A temporarily holding means is carried by the sleeve. The temporarily holding means can project outwardly from an outer peripheral surface of the sleeve to temporarily hold the bolt from being axially moved relative to the rotary member until the bolt is screwed into one of screw holes of one of the knuckle members to some extent, and the temporarily holding means can be retracted into the sleeve, until it is flush with the outer peripheral surface of the sleeve, when the bolt is screwed into the one screw hole of the knuckle member to some extent.

18 Claims, 7 Drawing Sheets

FIG. I(a)
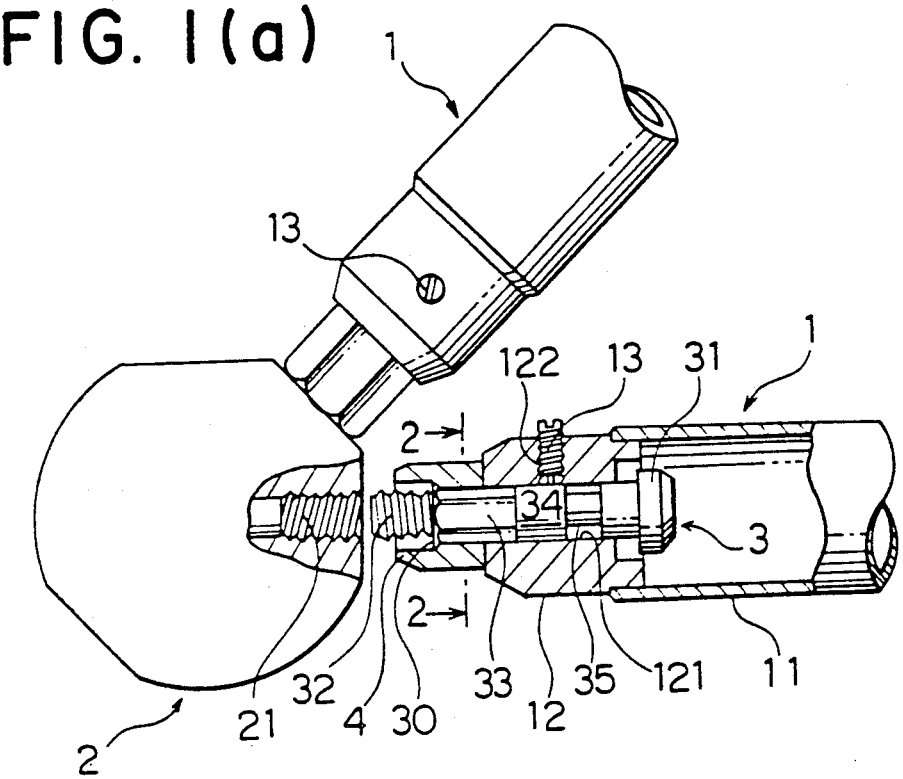
FIG. I(b)
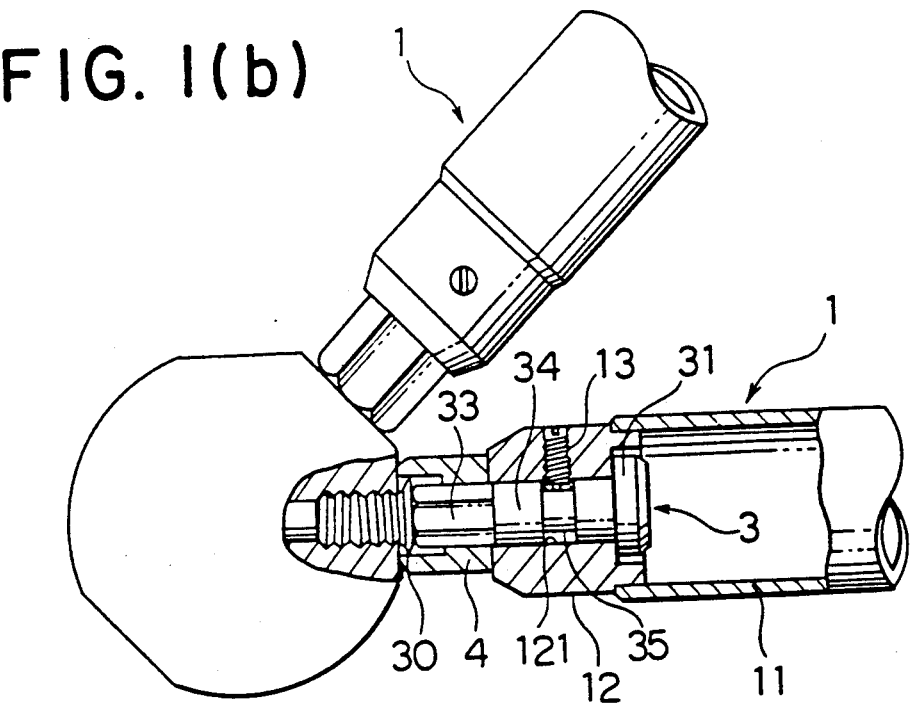

COUPLING FOR THREE-DIMENSIONAL FRAMED STRUCTURE

BACKGROUND OF THE INVENTION

1. Field of the Invention

This invention relates to a coupling composed of rod members and knuckle members and adapted to be assembled into a three-dimensional framed structure as a roof of, for example, a stadium, a pavilion or an art gallery or as decoration or interior in a variety of exhibition halls.

2. Description of the Related Art

Heretofore, a three-dimensional framed structure of the kind described above is built up by interconnecting pipe-like rod members end to end via ball-like knuckle members.

The conventional structures of the pipe-like rod members and the knuckle members will now be described with reference to FIG. 9 of the accompanying drawings.

Each of the rod members 1 has a body including a hollow pipe of steel or aluminum and a pair of frustoconical sleeves attached to opposite ends of the hollow pipe by welding. At each end of the rod member 1, a connecting bolt is inserted in the associated sleeve from inside, having a shaft projecting outwardly. The shaft of the connecting bolt has an intermediate portion of a polygonal cross section and is rotatable and movable outwardly and inwardly axially of the sleeve via a rotary member which is fitted on the intermediate portion of the projected shaft and which is polygonal in either outside or inside cross section. Specifically, the polygonal rotary member has a central bore having the same cross-sectional shape as that of the intermediate portion of the connecting bolt and also is in the shape of a hexagonal cylinder so as to be turned by a tool such as a spanner. The bolt has a screw portion having such a length that the bolt projects outwardly from the sleeve and then threadedly extends into a screw hole (described below) in the associated knuckle member 2.

When the bolt is retracted axially into the sleeve to the maximum extent, the extent of retraction is limited such as by a stop ring projecting outwardly from the end surface of the rotary member by a slight extent. This is because during assembling, turning of the rotary member for threaded connection with the knuckle member 2 can be performed quickly by the distal end of the bolt is inserted in the screw hole in the knuckle member 2. If the distal end of the bolt was retracted from the end surface of the rotary member into the rod member 1 a distal end of the rod member 1 was pressed, it would have been very difficult to screw the bolt into the screw hole in the knuckle member 2. For joining the rod member 1 with the knuckle member 2, the distal end of the bolt is inserted just in the mouth of one of plural screw holes in the surface of the knuckle member 2, and then the rotary member is turned in the fastening direction to screw the bolt into the screw hole. With continued turning of the rotary member to screw the bolt into the screw hole in the knuckle member 2, the distal end of the rotary member is pressed against a virtually flat peripheral surface about the screw hole so that the rod member 1 and the knuckle member 2 are firmly joined together. Likewise, another rod member 1 is joined with this knuckle member 2 at another screw hole thereof, and so forth. Thus a framed structure is built up progressively into a three-dimensional form.

However, when this conventional three-dimensional framed structure is constructed into a large-scale building, the structure itself weighs so considerably heavy that if any bolt should happen to be left unfastened during assembling, this would be a cause for a serious accident.

To prevent such an accident, one solution has been proposed by which the extent of axial movement of a bolt can be readily observed from outside by eye. Specifically, the rotary member has a radial through-slit extending axially, and the bolt has a pin insertion hole perpendicular to the axis of the shaft, in which hole a pin is fixedly fitted with its distal end projecting into the through-slit. When the rotary member, with the bolt, is turned, the bolt is moved forwardly and backwardly to a predetermined extent in the axial direction with respect to the rotary member. Therefore if the distal end of the bolt is received just in the mouth of the screw hole and then the rotary member is turned in the fastening direction, the bolt is threadedly inserted into the screw hole so that the rod member 1 and the knuckle member 2 can be joined together. At that time, whether the bolt is left unfastened can be recognized by the position of the distal end of the pin, in the through-slit of the rotary member, of the bolt.

With this conventional coupling, although the bolt can be prevented from being left unfastened, rainwater and dust would tend to permeate into the through-slit of the rotary member so that the bolt as well as other parts contiguous thereto would be corroded, thus exerting a potent influence upon the strength of the knuckle member. Also, since the bolt and the rotary member are joined together by a pin-and-slit connection, it is difficult to achieve an adequate degree of strength against the load when the bolt is fastened.

To solve this corrosion problem, a proposal has been made by, for example, Japanese Patent Laid-Open Publication 30742/1985. According to this proposal, in place of the through-slit of the rotary member, a radial threaded through-hole is formed in the rotary member, while an elongated groove is formed in the peripheral surface of the bolt, extending parallel to the axis of the bolt. And a screw pin is screwed into the threaded through-hole in such a manner that the distal end of the screw pin engages in the elongated groove. The elongated groove is deep locally at the bolt head side so that between the maximum position in which the bolt is fully retracted and the intermediate position in which the bolt is threadedly inserted into the screw hole of the knuckle member part of the way, the head of the screw pin projects from the surface of the rotary member and so that upon completion of fastening of the bolt, the head of the screw pin is retracted from the surface of the rotary member.

Therefore, since the head of the screw pin is retracted into the rotary member as the screw pin is screwed into the through-hole upon completion of fastening of the bolt, whether the bolt is left unfastened can be recognized by whether the head of the screw pin projects from the surface of the rotary member. In this prior structure, since there is no channel or path leading from the surface of the rotary member to its interior, rainwater, dust, etc. cannot permeate into the interior of the rotary member so that the bolt as well as other parts contiguous thereto are prevented from corroding.

For assembling the foregoing conventional three-dimensional framed structure, assuming that the positions of two ball-like knuckle members 2, 2 are already fixed, the distance between these two knuckle members 2, 2 is equal to the distance between the end surfaces of the two rotary members mounted at opposite ends of the rod member 1 and cannot be spread out with ease in view of the relationship with other components. Consequently, the entire length of the rod member 1 becomes practically longer by the length of the exposed distal end of each bolt projecting from the end surface of the associated rotary member so that the lengthened rod member 1 cannot be inserted between the two knuckle members 2, 2. If the lengthened rod member 1 is to be forced between the two knuckle members 2, 2, the framed structure must be pressed on its midportion by, for example, a gigantic jack to make the entire structure resiliently yielded until the rod member 1 can be inserted between the thus spread pair of knuckle members 2, 2, which must be performed in a big way. During that time, the surface of the knuckle member 1 would be damaged or the paint thereon would be peeled off as the distal end of the bolt slides on the surface of the knuckle member 2, and when it comes to the worst, the bolt itself would be broken. As a consequence, the framed structure to be built up must be assembled progressively from one end of its span toward the other end; its assembling order must be carefully decided, and such a decision of the assembling order would be restricted markedly.

To this end, another proposal has been made by, for example, Japanese Utility Model Laid-Open Publication 123102/1986. In this prior structure, a pin projecting radially from the bolt is inserted in an axial slit in the rotary member so that a predetermined extent of axial movement of the bolt relative to the rotary member is allowed and, at the same time, the bolt is normally urged, from its rear side by a resilient member, so as to project from the rotary member. For joining the rod member 1 with the knuckle member 7, the distal end of the bolt is axially aligned with a screw hole in the knuckle member 2 with pushing the bolt into the rotary member against the bias of the resilient member, and then the distal end of the bolt is automatically inserted into the screw hole by the biasing force of the resilient member, whereupon it is started screwing the screw pin. Therefore, according to this prior structure, even in the case the distance between the two knuckle members 2, 2 is exactly equal to the length of the body of the rod member 1, it is unnecessary to apply an excessive force on other parts around and it is also possible to create room for deciding the assembling order.

In case of this proposed structure, therefore, since it is not equipped with any means for holding the bolt temporarily when the bolt is pushed into the rotary member against the bias of the resilient member, the distal end of the bolt normally tends to project from the end surface of the rotary member so that the distal end of the bolt rubs the surface of the knuckle member 2 when the distal end of the bolt is positioned in the screw hole of the knuckle member 2, thus abrading or scratching the surface of the knuckle 2 as before. Further, like Japanese Patent Laid-Open Publication 30742/1985 (discussed above), rainwater and dust tend to permeate from the through-slit of the rotary member so that various parts can be corroded and hence a problem as to the strength would arise. And dust or dirt would be attached to the corroded parts, which would be a hindrance to, for example, disassembling.

Namely, in this prior kind of coupling for three-dimensional frame structure, since the bolt is retracted into the rotary member when the rod member is positioned with respect to the knuckle member, easy setting of the rod and knuckle members can be achieved. However, this prior art has been encountered with the problems that the bolt is left not temporarily held, that temporarily holding is unreliable, that the rotary member tends to be removed, and that the operation when fastening the bolt is laborious.

With the foregoing problems in view, an improvement has been proposed by, for example, Japanese Patent Laid-Open Publications 147029/1988 and 102147/1989. This prior structure, whose general concept is similar to that of the previously proposed prior structure, has an additional feature that the rod member 1 has one or two screw elements movable back and forth radially of only the sleeve or of both the sleeve and the rotary member. In use, when the bolt is to be unfastened, the bolt is pushed into the rotary member against the bias of the resilient member, whereupon the screw element or elements are threadedly advanced to temporarily hold the bolt in that position. When the bolt is to be fastened, the distal end of the temporarily held bolt is axially aligned with the screw hole of the knuckle member 2, whereupon the screw element or elements are threadedly retracted so that the distal end of the bolt is automatically inserted into the screw hole under the bias of the resilient member. According to this prior structure, the surface of the knuckle member 2 can be prevented from being rubbed by the distal end of the bolt when the rod member 1 is set between a pair of the knuckle members 2, 2, thus maintaining the value of product.

However, depending upon the pressing force of the screw element or elements, the bolt tends to move in both the sleeve and the rotary member axially thereof so that the distal end of the bolt would happen to project from the end surface of the rotary member. In the case the two screw elements are used on the sleeve and the rotary member, respectively, it is necessary to threadedly retract each screw element to release the bolt from the temporary holding when fastening the bolt with the knuckle member 1, which is laborious and time-consuming. In addition, the rotary member can be removed easily.

Accordingly also in this prior coupling, since a threaded insertion of the bolt depends on a pin-and-groove connection, it is difficult to achieve an adequate degree of strength against the load when fastening the bolt with the knuckle member. More particularly since the rotary member, on which a moment is exerted from the external, has a screw through-hole extending radially, it is inevitable that the strength of the rotary member would be lowered and that the screw members themselves can easily be deformed.

SUMMARY OF THE INVENTION

It is therefore an object of this invention to provide a coupling, for a three-dimentional framed structure, with which a workperson can recognize at a glance whether there is any bolt having been left unfastened.

Another object of the invention is to provide a coupling, for a three-dimensional framed structure, with which an individual rod member can be inserted between two knuckle members, which have previously fixed to adjacent rod members, without yielding these adjacent rod members and without scratching the surfaces of the two knuckle members.

According to this invention, there is provided a coupling for a three-dimensional framed structure, comprising: a plurality of knuckle members each having a plurality of screw holes; a plurality of rod members adapted to be interconnected end to end by the knuckle members, each of the rod members including a pair of sleeves mounted one on each of opposite ends of the individual rod member, a pair of connecting bolts each having a head and axially inserted through a respective one of the sleeves from an inner side thereof, and a pair of rotary members each disposed at an outer end of a respective one of the sleeves in such a manner that the individual rotary member is unable to be turned relative to a respective one of the connecting bolts and is able to be moved axially relative thereto; and temporarily holding means carried by the individual sleeve, the temporarily holding means being able to project outwardly from an outer peripheral surface of the individual sleeve to temporarily hold the respective bolt from being axially moved relative to the rotary member until the respective bolt is threadedly inserted into one of the screw holes of one of the knuckle members to a predetermined extent, the temporarily holding means being able to retract into the individual sleeve, until it is at least flush with the outer peripheral surface of the individual sleeve, when the respective bolt is threadedly inserted into the one screw hole of the individual knuckle member to the predetermined extent.

With this arrangement, before the three-dimensional framed structure is assembled, the temporarily holding means (screw pin) is projecting from the outer peripheral surface of the sleeve. Keeping this posture, the distal end of the bolt is put in the screw hole of the knuckle member, whereupon the rotary member is turned in the fastening direction so that the bolt is turned along with the rotary member and is threadedly inserted into the screw hole of the knuckle member, during which time no external force is exerted on the screw pin. When, after a predetermined amount of threaded insertion of the bolt, the screw pin is screwed until the end surface of its head is flush with the outer peripheral surface of the sleeve, the distal end of the screw pin reaches the bottom of the annular groove so that a workperson can recognize at a glance whether the bolt is left unfastened.

For a specific feature of the invention, a resilient element is disposed in the rotary member for normally urging the bolt axially outwardly. When the rod member is in a free form, the distal end of the bolt is slightly retracted in the end surface of the rotary member against the bias of the resilient member, and the screw pin is engagement with the annular groove of the bolt to temporarily hold the bolt. At that time, the entire length of the rod member is substantially equal to the fixed distance between the two knuckle members. Therefore, the rod member can be inserted between the two knuckle members, which have previously fixedly positioned, without difficulty.

For assembling the three-dimensional structure, with the distal end of each of the opposite bolts being retracted in the rotary member, the rod member is inserted between two knuckle members in such a manner that the distal end surface of each bolt is axially aligned with a predetermined screw hole of the respective knuckle member. Then the temporarily holding means (screw pin) is unscrewed to release the bolt from the temporarily holding so that the distal end of is automatically projected from the outer end surface of the rotary member and pushed into the screw hole under the bias of the resilient member. In this posture, when the rotary member is turned in the fastening direction by using a suitable turning tool, the bolt is turned in the same direction and is screwed into the screw hole of the knuckle member.

Further, for another feature, a stopping means is carried by the bolt for preventing the rotary member from being removed from the bolt during either assembling or not assembling.

BRIEF DESCRIPTION OF THE DRAWINGS

FIGS. 1(a) and 1(b) are fragmentary side views, with parts broken away, of a coupling, for a three-dimensional framed structure, according to a first embodiment of this invention, showing the manner in which rod members are interconnected end to end by a knuckle member;

DETAILED DESCRIPTION

Figure 2:
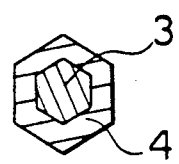
FIG. 2 is a cross-sectional view taken along line A—A of FIG. 1(a)

The principle of this invention is particularly useful when embodied in a coupling, for a three-dimensional framed structure, such as shown in FIGS. 1 and 2.

The coupling generally comprises a plurality of rod members 1 (only two shown in FIGS. 1(a) and 1(b)) and a plurality of knuckle members 2 (only one shown in FIGS. 1(a) and 1(b)).

Each of the rod members 1 includes a body 11 such as in the form of a steel tube or an aluminum alloy tube, a pair of sleeves 12, 12 attached respectively to opposite ends of the body 11 by welding or by a threaded connection. Each of the sleeves 12 has a central bore 121 in which a connecting bolt 3 is inserted. The sleeve 12 has also a radial screw through-hole 122 communicating with the central bore 121, in which through-hole a screw pin 13 is screwed.

The connecting bolt 3 has a large-diameter head 31 and a shaft whose distal end portion is threaded at 32. Between such threaded portion 32 and the head 31, the connecting bolt 3 has a first shaft portion 33 of polygonal cross section (FIG. 2) and a second shaft portion 34 of circular cross section. The second shaft portion 34 has centrally in and around its cylindrical surface an annular groove 35. The positional relationship between the screw through-hole 122 of the sleeve 12 and the annular groove 35 of the bolt 3 is such that when the bolt projects from the central bore 121 of the sleeve 12 to the maximum extent, the screw through-hole 122 and the annular groove 35 are radially aligned with each other. The depth of the annular groove 35 is such that when the screw pin 13 engages in the annular groove 35, the head of the screw pin 13 is flush with the surface of the sleeve 12.

Figure 6:
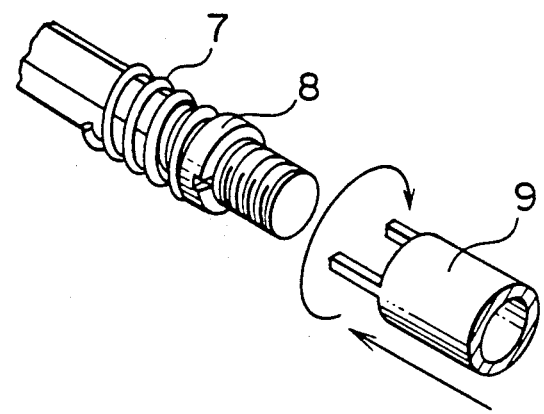
FIG. 6 shows the manner in which a stop for preventing a rotary member from being removed are attached to the bolt.
Figure 7:
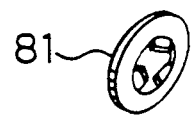
FIG. 7 is a perspective view of a modified stop.

On and around the first shaft portion 33 of the bolt 34 projecting from the central bore of the sleeve 12, a rotary member 4 for fastening and unfastening the bolt is mounted. The outer cross-sectional shape of the rotary member 4 is such that it can be turned by a tool such as a spanner, usually hexagonal. The inner cross-sectional shape of one axial half of the rotary member 4 is complementary to the polygonal shape of the bolt 3, while the inner cross-sectional shape of the other axial half of the rotary member 4 is defined by a large-diameter cylindrical surface and a step portion. Consequently, when the polygonal half portion of the rotary member 4 is received in the first shaft portion (polygonal portion) 33 of the bolt 4, a gap is created between the threaded portion 32 of the bolt 3 and the inner cylindrical surface of the rotary member 4. Further, on and around the border of the threaded portion 32 and the polygonal portion 33 of the bolt 3, a stop ring 30 is threaded from the threaded distal end portion. The stop ring 30 may be any of a variety of forms, preferably a planar steel ring 81 having a plurality of resilient tongues projecting inwardly radially from the inner edge of the ring 81 as shown in FIG. 7, or an annular element 8 having a female screw threadedly engageable with the threaded portion of the bolt 3 as shown in FIG. 6.

In this embodiment, the stop ring 30 is mounted on the threaded portion 32 of the bolt 3 in such a position that the distal end of the threaded portion 32 projects slightly from the rotary member 4. On the other hand, the knuckle member 2, which is to be joined with one end of the rod member 1, is identical in structure with that of the prior art, without any addition or modification.

For joining the rod member 1 with the knuckle member 2, the screw pin 13 is turned so as to allow axial movement of the bolt 3 as shown in FIG. 1(a) and then the distal end of the bolt 3 is inserted in the screw hole 21 of the knuckle member 2, whereupon the rotary member 4 is turned in the fastening direction by using a turning tool such as a spanner so that the bolt 3 is threaded inserted into the screw hole 21 of the knuckle member 2. Thus the bolt 3 has completely fastened to the knuckle member 2, at which time the distal end of the screw pin 13 is radially aligned with the annular groove 35 of the bolt 3. Now, if the screw pin 13 is turned so as to prevent axial movement of the bolt 3, the distal end of the screw pin 13 comes into engagement with the annular groove 35, at which time the end surface of the head of the screw pin 13 is flush with the surface of the sleeve 12 as shown in FIG. 1(b).

Because as the rotary member 4 is turned, the bolt 3 is also turned simultaneously with the rotary member 4, with its polygonal outer surface engaging the polygonal surface of the rotary member 4, the turning force is reliably transmitted from the rotary member 4 to the bolt 3 so that the screw pin 13 would receive no load and hence would not be damaged.

Further, in this embodiment, whether the bolt 3 is left unfastened can be recognized from whether the screw pin 13 projects from the surface of the sleeve 12. Because there is no channel or path for rainwater and dust to permeate, the bolt and its associated elements therearound are free from corrosion.

Figure 3:
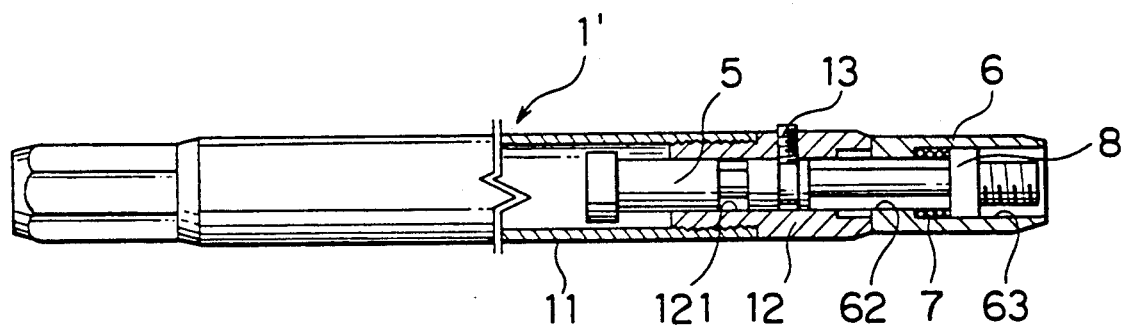
FIG. 3 is a side view, partially in cross section, of each of rod members of a modified coupling, for a three-dimensional framed structure, according to a second embodiment.

FIGS. 3 through 6 show a modified rod member according to a second embodiment, generally designated by numeral 1' (FIG. 3). The modified rod member 1' is similar in structure to that of the first embodiment except a connecting bolt 5; therefore, like reference numerals designate similar parts or elements throughout the first and second embodiments.

Figure 4A:
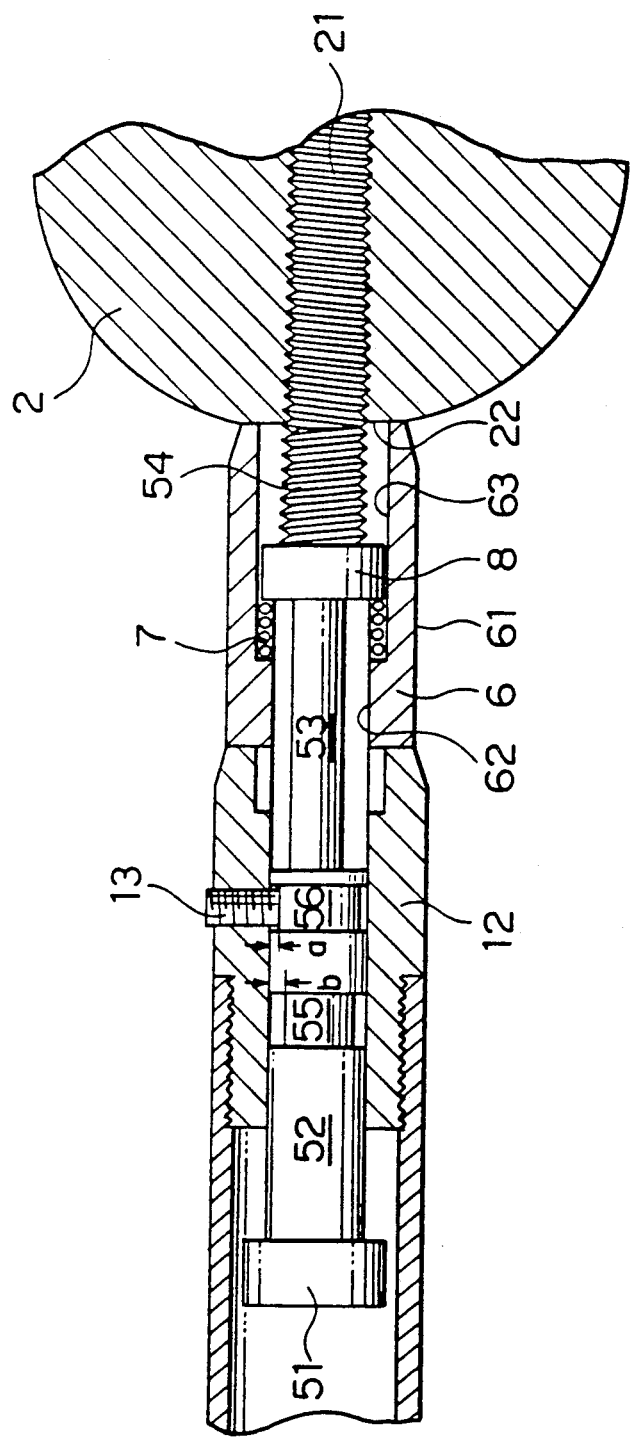
FIGS. 4(a), 4(b) and 4(c) are cross-sectional views showing the manner in which the rod member of FIG. 3 is progressively joined with a knuckle member.
Figure 4B:
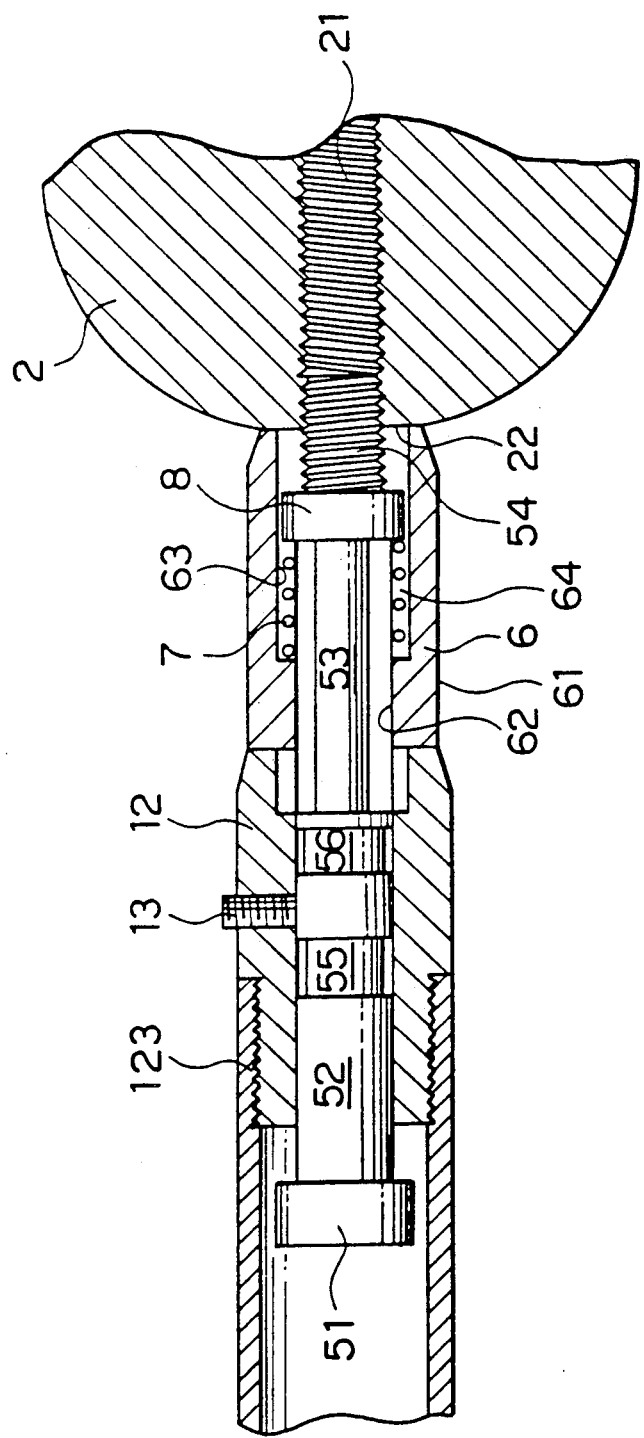
Figure 4C:
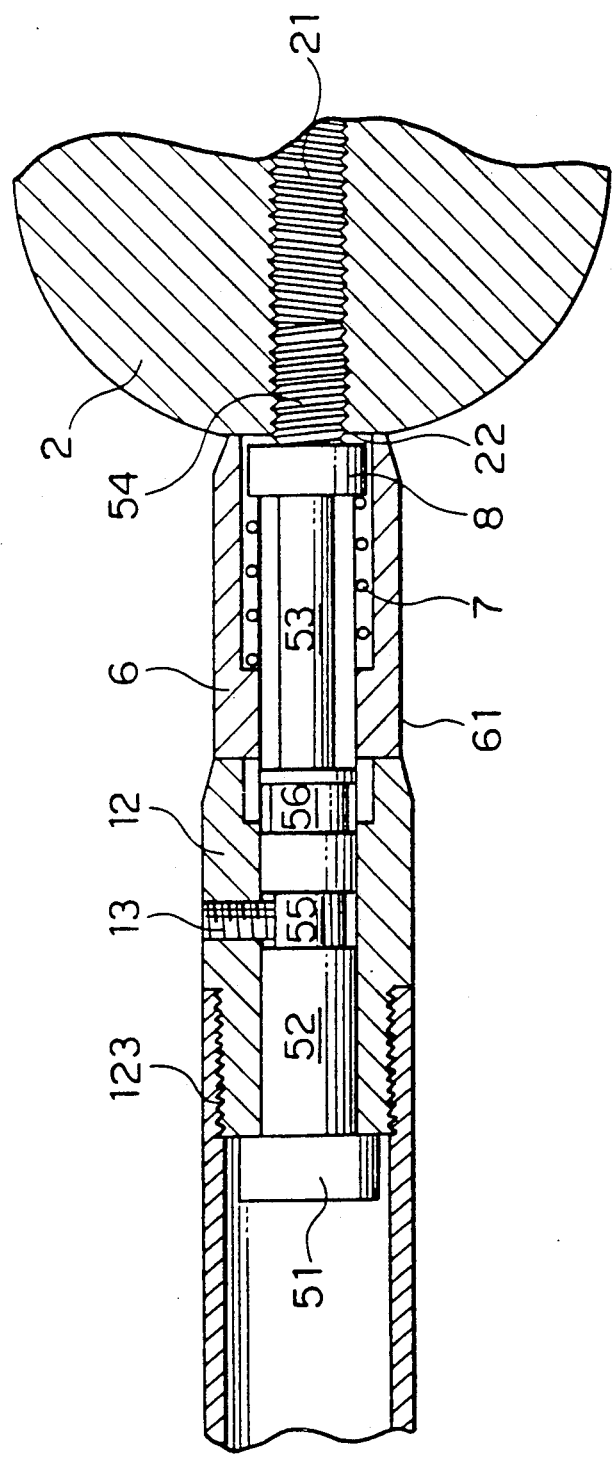
Figure 5:
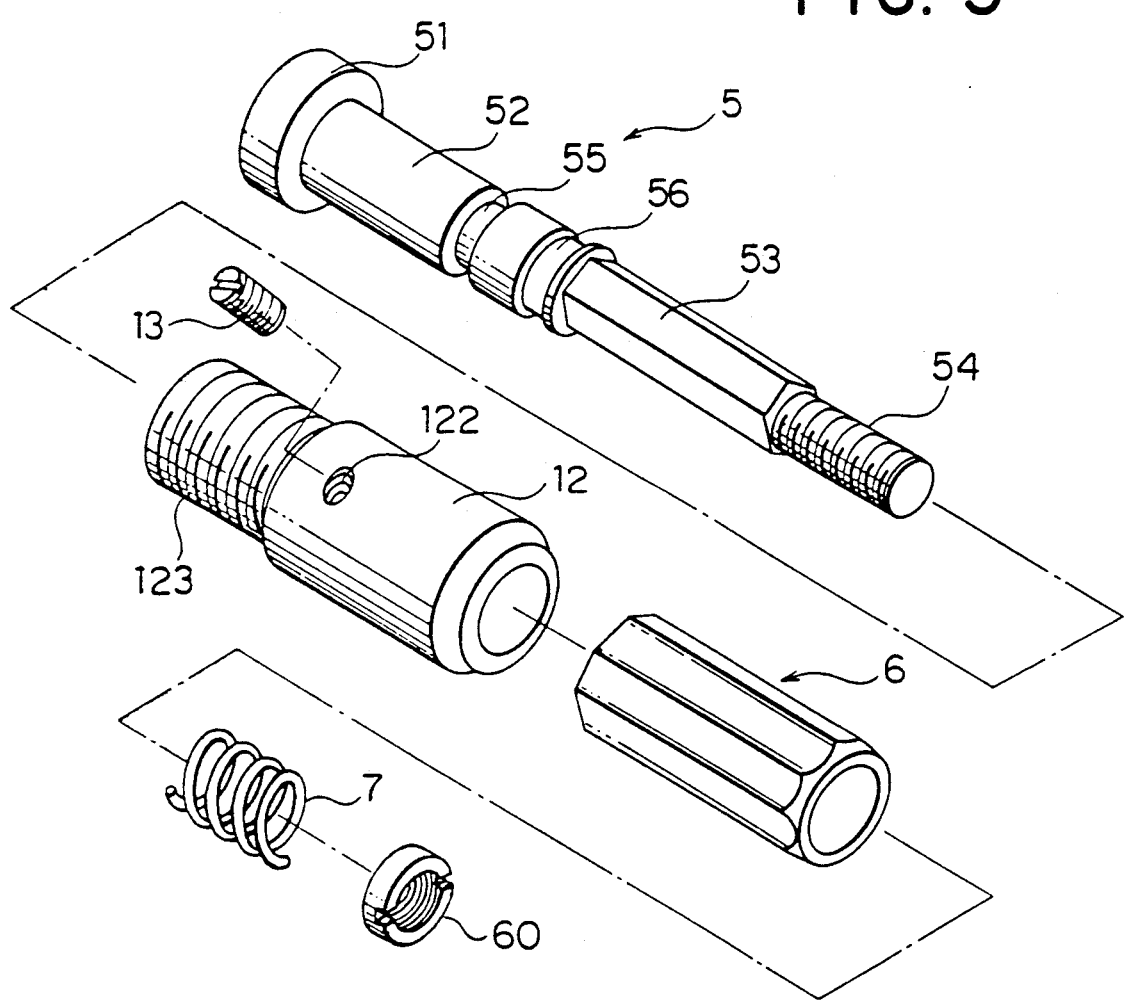
FIG. 5 is an exploded perspective view of a bolt and its associated elements.

The bolt 5, as shown in FIGS. 3, 4 and 5, has a head 51, a first shaft portion 52 of circular cross section, a second shaft portion 53 of polygonal cross section, and a threaded portion 54 in this order. In the second embodiment, the first shaft portion 52 has on and around a pair of annular grooves 55, 56 which are identical in width and different in depth. The distance between these two annular grooves 55, 56 is equal to the distance between a first position in which the bolt 5 is retracted to the maximum extent and in which the end surface of the threaded portion 54 of the bolt 5 is slightly retracted in the distal end surface of the rotary member 6, and a second position in which the bolt 5 is threadedly inserted into the screw hole 21 of the knuckle member 2 to a predetermined extent to complete fastening. As shown in FIG. 4(a), the depth a of one annular groove 56 on the side toward the threaded portion 54 is smaller than the depth b of the other annular groove 55 on the side toward the head 51. On the other hand, the sleeve 12 of the rod member 1' has a radial screw through-hole 122, in which a screw pin 13 for fixing the bolt 5 is screwed. The screw pin 13 can be brought into and out of engagement with two annular grooves 55, 56 one at a time as it is moved forwardly and backwardly.

The rotary member 6, as is apparent from FIGS. 3 through 5, is entirely polygonal in outside cross section (outer surface 61) and partially polygonal in inside cross section (inner wall surface 62) engageable with the sleeve 12, and has a circular cylindrical inner surface 63 contiguous to the inner wall surface 62 via a step portion and having an inside diameter larger than the outside diameter of the shaft of the bolt 5. Thus there is defined between the shaft of the bolt 5 and the inner surface 63 of the rotary member 6 a gap 64 in which a compression spring 7 is received. Further, an annular fixing element 8 having a female screw is threaded onto the threaded portion 54 of the bolt 5 by a turning tool 9 until the distal end of the fixing element 8 is mounted on the first shaft portion 53 of the bolt 5. The fixing element 8 and the step portion of the rotary element 6 jointly constitute a seat for the compression spring 7. When the screw pin 13 screwed in the screw through-hole 122 of the sleeve 12 is turned to fix the bolt 5, the bolt 5 is allowed to project to the maximum extent from the rotary member 6 under the bias of the compression spring 7. This projected extent is determined depending on the extent to which the bolt 5 is to be threadedly inserted into the screw hole 21 of the knuckle member 2; if the screw pin 13 is screwed into the screw through-hole 122 when the bolt 5 is moved to project to the maximum extent, the distal end of the screw pin 13 comes into engagement with the annular groove 55 on the side toward the head of the bolt 51. The depth b of this annular groove 55 is such that the end surface of the head of the screw pin 13 does not project from the surface of the sleeve 12 when the screw pin 13 is screwed into the screw through-hole 122. Further, when the distal end surface of the bolt 5 comes inwardly of the end surface of the rotary member 6 as the bolt 5 is pushed into the rotary member 6 under the bias of the compression spring 7, the screw pin 13 is radially aligned with the annular groove 56 on the side toward the threaded portion 54 of the bolt 5. At that time, since the depth a of this annular groove 56 is smaller than the depth b of the annular groove 55, the head portion of the screw pin 13 projects slightly from the surface of the sleeve 12 even when the screw pin 13 is brought into engagement with the annular groove 56.

For inserting the rod member 1' between two knuckle members 2, 2 which are spaced from each other by a fixed distance, at each end of the rod member 1', firstly the screw pin 13 is turned to fix the bolt 5, and then the bolt 5 is pushed into the rotary member 6 against the bias of the compression spring 7, whereupon the screw pin 13 is turned so as to engage in the annular groove 56 on the side toward the threaded portion of the bolt 5, thus temporarily preventing the movement of the bolt 5. The rod member 1' in this posture is placed between these two knuckle members 2, 2, and the distal ends of the opposite bolts 5 are axially aligned with the respective predetermined screw holes 21, 21 of the associated knuckle members 2, 2 (FIG. 4(a)).

When the screw pin 13 is turned to release the bolt 5 after completion of this positioning, the bolt 5 is released from threaded engagement with the screw pin 13 and is thereby automatically pushed under the bias of the compression spring 7 so that its distal end of the bolt 5 is inserted into the screw hole 21 of the knuckle member 2. Now, if the rotary member 6 is turned in the fastening direction by using a turning tool such as a spanner, the bolt 5 is turned with the rotary member 6 so that the threaded portion 54 is screwed into the screw hole 21 of the knuckle member 2 (FIG. 4(b)).

Upon completion of fastening of the bolt 5, the screw pin 13 of the sleeve 12 is turned in the direction of fixing the bolt 5 so that the distal end of the bolt 5 is brought into engagement with the deep groove 55 on the side toward the head of the bolt 5, at which time the end surface of the head of the screw pin 13 is flush with the surface of the sleeve 12 (FIG. 4(c)).

Therefore, in the second embodiment, when the screw pin 13 engages in one annular groove 56 to temporarily prevent the movement of the bolt 5 (FIG. 4(a)), or when the bolt 5 is threadedly inserted into the knuckle member 2 to a position short of the limit (FIG. 4(b)), the head of the screw pin 13 projects from the outer peripheral surface of the sleeve 12 so that it can be recognized at a glance that the rod member 1' has been joined with the knuckle member 2 only incompletely. When the screw pin 13 is brought into engagement with the other annular groove 55 upon completion of joining the rod member 1' with the knuckle member 2, the end surface of the head of the screw pin 13 is flush with the surface of the sleeve 12 so that it can be noticed at a glance that the bolt 5 has been joined with the knuckle member 2 completely.

One of significant features of the second embodiment is that as described above, it is possible to temporarily stop the bolt 5 in a posture pushed into the rotary member 6 against the bias of the compression spring 7.

Figure 8:
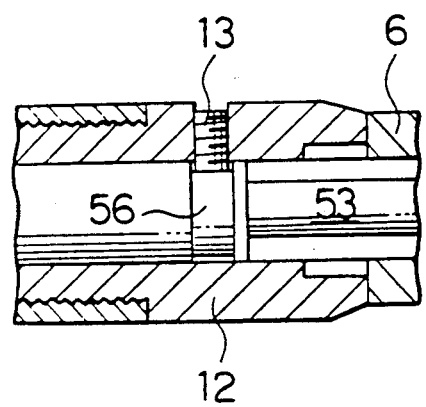
FIG. 8 is a fragmentary cross-sectional view of a modified rod member according to a third embodiment.
Figure 9:
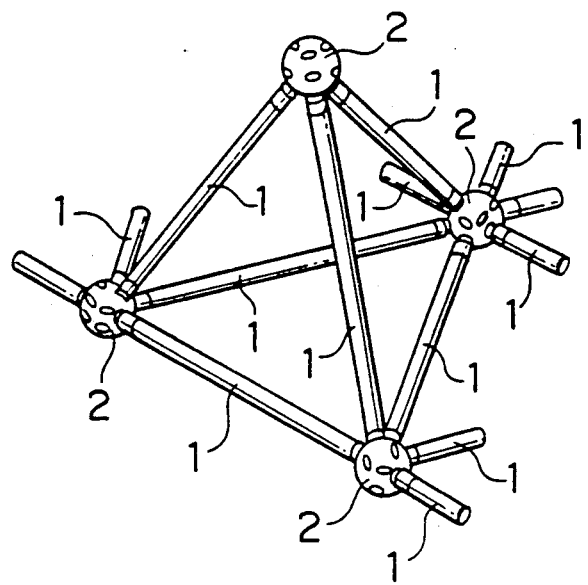
FIG. 9 is a fragmentary perspective view of a three-dimensional framed structure built up by the coupling of this invention.

Consequently, as a matter of fact, another embodiment of FIG. 8 resides within the coverage of this invention. Namely, in the second embodiment, one of the annular grooves 55 may be omitted, with the other annular groove 56 remaining. In this case, from a view point of beauty, the length of the screw pin 13 is preferably shortened by a length corresponding to the depth of the annular groove 56 so that the head of the screw pin 13 does not project from the surface of the sleeve 12 even when the bolt 5 is not temporarily stopped.

In each of the foregoing embodiments, the body 11 of the individual rod member 1, 1' is in the form of a pipe but may of course be a solid cylinder having a circular or any other polygonal cross-sectional shape. Although the body 11 of the rod member 1, 1' is fixed to the sleeve 12 by a threaded connection in the illustrated embodiments, it may alternatively be fixed by welding, in which event the direction of screw of the threaded end portion 123 of the sleeve 12 is opposite to that of the bolt 3 or 5.

The compression spring 7 serving as the resilient member to urge the bolt 5 may be replaced by an elastic member such as rubber. For an alternative location, the resilient or elastic member may be disposed on the rear surface of the bolt head in the sleeve 12.

The transmission of turning force of the rotary member 6 to the bolt 3 or 5 should by no means be limited to the interengagement of the confronting polygonal surfaces and may be any alternative way, such as spline and key connections, in which the relative turning of two companion elements should impossible while their relative axial movement should be allowed.

Further, the stop means for preventing the rotary member from removing from the bolt 5 should not limited to the annular fixing element 8 of FIG. 6, which has a female screw, and may be an alternative form, for example, a planar steel ring 81 having a plurality of resilient tongues projecting inwardly radially from the inner edge of the ring 81 as shown in FIG. 7.

Any other modifications may be suggested by those versed in the art within the coverage by the appended claims.

According to this invention, since the screw pin, which serves to confirm whether the bolt is left unfastened, is carried by the sleeve, on which a very large load about the center of rotation would not happen to be exerted, rather than by the rotary member, on which an excessively large load must be exerted, no turning force acts on the screw pin when the rotary member is turned in the fastening direction to screw the distal end of the bolt into the screw hole of the knuckle member. Therefore, the screw pin itself is free of any deformation and hence can be inserted into the annular groove of the bolt exactly, thus guaranteeing reliable recognition as to whether the bolt is left unfastened.

Further, since the bolt is equipped with stop means for preventing the rotary member from being removed from the bolt, it is possible to avoid any accident or trouble due to the removal of the rotary member itself and/or its associated parts or elements even if the bolt is freed for axial movement during the joining work.

More particularly according to the second embodiment, when placing the rod member between two knuckle members during the assembling, it is possible to temporarily stop the bolt so as not to project from the rotary member so that the bolt can be inserted between these two knuckle members, which are spaced from each other by a fixed distance, without difficulty. Then if the bolt is released from the temporarily holding by bringing the stop means on the rod member out of engagement with the annular groove of the bolt after the distal end surface of the bolt has been positioned to face the screw hole of the knuckle member, the distal end of the bolt is automatically inserted into the screw hole under the bias of the resilient member, whereupon if the rotary member is turned in the fastening direction, the bolt is screwed into the screw hole in the same manner as conventional, thus realizing smooth and quick fastening.

In addition, since the depth of the annular groove of the bolt is such that the head of the screw pin would not happen to project from the surface of the sleeve at the final stage of assembling, it is possible to build up a three-dimensional framed structure without deteriorating the beauty of components. Also, because of no channel or path for permeation of rainwater, the bolt and its associated elements would be free from corrosion.

What is claimed is:

1. A coupling for a three-dimensional framed structure, comprising:
   (a) a plurality of knuckle members each having a plurality of screw holes;
   (b) a plurality of rod members adapted to be interconnected end to end by said knuckle members, each of the rod members including a pair of sleeves mounted one on each of opposite ends of each said rod member, a pair of connecting bolts each having a head and axially inserted through a respective one of said sleeves from an inner side thereof, and a pair of rotary members each disposed at an outer end of a respective one of said sleeves, each engaged with a respective one of said connecting bolts in such a manner that each said rotary member is turnable with said respective one of said connecting bolts and said respective one of said connecting bolts is movable axially relative to said rotary member; and
   (c) holding means carried by each said sleeve, said holding means being slightly projected outwardly from an outer peripheral surface of each said sleeve while the bolt is not engaged with said knuckle member and said holding means temporarily hold said respective one bolt from being axially moved relative to said rotary member until said holding means are released, said respective one bolt is threadedly insertable into one of said screw holes of one of said knuckle members to a predetermined extent, said holding means being insertable into each said sleeve, until it is at least flush with said outer peripheral surface of each said sleeve, when said respective one bolt is threadedly inserted into said one screw hole of each said knuckle member to said predetermined extent.

2. A coupling according to claim 1, wherein said holding means includes a screw through-hole extending radially of each said sleeve, a screw pin adapted to be threadedly inserted into said screw through-hole, and at least one annular groove formed around said respective one bolt, engageable with said screw pin when a distal end surface of said respective one bolt and a distal end surface of said rotary member are substantially flush.

3. A coupling according to claim 1, wherein each said rotary member has a polygonal inside cross-sectional shape, and each said bolt partially has a polygonal outside cross-sectional shape substantially complementary to said polygonal inside cross-sectional shape of each said rotary member, whereby such polygonal portion of each said bolt is received in such polygonal portion of said respective one rotary member.

4. A coupling according to claim 1, further comprising stopping means for preventing each said rotary member from being removed from said respective one bolt.

5. A coupling according to claim 4, wherein said stopping means is an annular element detachably mounted on each said bolt.

6. A coupling according to claim 1, further comprising means normally urging each said bolt forwardly.

7. A coupling according to claim 2, wherein said at least one annular groove is two annular grooves, one of said annular grooves being engageable with said screw pin when a distal end of each said bolt is retracted in each said rotary member, and the other annular groove being engageable with said screw pin when each said bolt is threadedly inserted into said one screw hole of each said knuckle member.

8. A coupling according to claim 7, wherein said one annular groove on the side toward the distal end of said bolt has a depth smaller than the depth of said other annular groove on the side toward the head of said bolt.

9. A coupling according to claim 1, wherein said holding means includes a screw through-hole extending radially of each said sleeve, a screw pin adapted to be threadingly inserted into said screw through-hole, and at least one annular groove formed around said respective one bolt, engageable with said screw pin when said respective one bolt is threadingly inserted into said one screw hole of each said knuckle member to said predetermined extent.

10. A coupling for a three-dimensional framed structure, comprising:
    a plurality of knuckle members each having a plurality of screw holes;
    a plurality of rod members adapted to be interconnected end to end by said knuckle members, each of said rod members including a pair of sleeves mounted one on each of said opposite ends of each said rod member, a pair of connecting bolts each having a head and axially inserted through a respective one of said sleeves from an inner side thereof, and a pair or rotary members each disposed at an outer end of a respective one of said sleeves, each engaged with a respective one of said connecting bolts, in such a manner that each said rotary member is turnable to turn said respective one of said connecting bolts about its longitudinal axis, and said respective one of said connecting bolts is movable axially relative to said rotary member; and
    holding means carried by each said sleeve, said holding means for temporarily holding said respective one bolt from being axially moved relative to said rotary member until said holding means are released, said respective one bolt is threadingly insertable into one of said screw holes of one of said knuckle members to a predetermined extent, said holding means being reengageable to said respective one bolt by insertion into said sleeve once said respective one bolt is threadingly inserted into one screw hole of each said knuckle member to said predetermined extent, to give visual indication of insertion of said respective one bolt into said screw hole to said predetermined extent.

11. A coupling according to claim 10, wherein said holding means comprises a screw pin which has a trailing end which projects outwardly of said sleeve and said screw pin is fully insertable with said trailing end recessed at least flush with an outside surface of said sleeve, only when said respective one bolt is threadingly inserted into said one screw hole of each said knuckle member to said predetermined extent.

12. A coupling according to claim 11, wherein said respective one bolt provides at least one annular groove and said screw pin is insertable into said annular groove when said respective one bolt is threadingly inserted into said one screw hole of each said knuckle member to said predetermined extent, said annular groove being of a depth to allow said screw pin to recess at least flushly with said outside surface of said sleeve.

13. A coupling according to claim 12, wherein said respective one bolt provides a second annular groove engageable by said screw pin when a distal end surface of said respective one bolt and a distal end surface of said rotary member are substantially flush, said respective one bolt in a retracted condition with respect to said rotary member.

14. A coupling according to claim 13, wherein each said rotary member has a polygonal inside cross sectional shape, and each said bolt partially has a polygonal outside cross sectional shape substantially complimentary to said polygonal inside cross sectional shape of each said rotary member, whereby such polygonal portion of each said bolt is received in such polygonal portion of said respective one rotary member.

15. A coupling according to claim 14 further comprising stopping means for preventing each said rotary member from being removed from said respective one bolt.

16. A coupling according to claim 15, wherein said stopping means is an annular element detachably mounted on each said bolt, capturing said rotary member between said stopping means and said respective sleeve.

17. A coupling according to claim 13 comprising spring means normally urging each said bolt forwardly of said rotary member.

18. A coupling according to claim 13, wherein said depth of said second annular groove is more shallow than a depth of said annular groove.

* * * * *